United States Patent
Yoshitomi et al.

(10) Patent No.: US 8,974,985 B2
(45) Date of Patent: Mar. 10, 2015

(54) FUEL CELL UNIT BOX AND FUEL CELL

(75) Inventors: Ryoichi Yoshitomi, Utsunomiya (JP);
Ayumu Ishizuka, Utsunomiya (JP);
Makoto Tsuji, Saitama (JP); Yositaka Hattori, Maebashi (JP); Shigeru Maniwa, Utsunomiya (JP); Daisuke Nakagawara, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1224 days.

(21) Appl. No.: 12/134,596

(22) Filed: Jun. 6, 2008

(65) Prior Publication Data
US 2008/0305383 A1    Dec. 11, 2008

(30) Foreign Application Priority Data
Jun. 7, 2007    (JP) ................................. 2007-151063

(51) Int. Cl.
*H01M 2/02*    (2006.01)
*H01M 2/10*    (2006.01)
*H01M 8/24*    (2006.01)

(52) U.S. Cl.
CPC .............. *H01M 8/2475* (2013.01); *Y02E 60/50* (2013.01)

USPC ............................................ 429/511; 429/507

(58) Field of Classification Search
USPC .................. 429/467, 70, 471, 508, 507, 511; 16/387, 252, 342, 211, 386, 392, 50
See application file for complete search history.

(56) References Cited

U.S. PATENT DOCUMENTS

| | | | | |
|---|---|---|---|---|
| 3,479,683 A | * | 11/1969 | Hull | 16/263 |
| RE37,712 E | * | 5/2002 | Gannon | 16/342 |
| 6,855,448 B2 | * | 2/2005 | Kikuchi et al. | 429/454 |

FOREIGN PATENT DOCUMENTS

JP        2002-298901        10/2002

* cited by examiner

*Primary Examiner* — Muhammad Siddiquee
(74) *Attorney, Agent, or Firm* — Nelson Mullins Riley & Scarborough LLP; Anthony A. Laurentano (57) ABSTRACT

A stack hinge is formed by stacking a plurality of plate hinge parts each having the same shape. Each of the plate hinge parts has a tab having a pin through hole for engagement with a joint pin and a joint portion joined to a panel of a unit box. The plate hinge parts are stacked by aligning the pin through holes and fixed together to assemble the plate hinge parts into a single hinge member.

6 Claims, 11 Drawing Sheets

PRIOR ART

FIG.9

PRIOR ART

FIG.10

PRIOR ART

FIG.11

PRIOR ART

FUEL CELL UNIT BOX AND FUEL CELL

BACKGROUND OF THE INVENTION

1. Field of the Invention

The present invention relates to a rectangular unit box for a fuel cell containing a stack body as a cell stack formed by stacking a large number of unit cells. Further, the present invention relates to the fuel cell.

2. Description of the Related Art

In general, a fuel cell is formed by placing a stack body as a cell stack formed by stacking a large number of unit cells in a rectangular unit box. In the structure, after the cell stack is used for a certain period, maintenance operation is required for the cell stack. For example, if any of the unit cells has a defect without reaching the desired output level, the defective unit cell needs to be replaced with a new unit cell. For this purpose, in the unit box, hinges are used for detachably coupling panels together into a box shape so that the unit box can be assembled, and disassembled easily (see Japanese Laid-Open Patent Publication No. 2002-298901).

Figure 8:
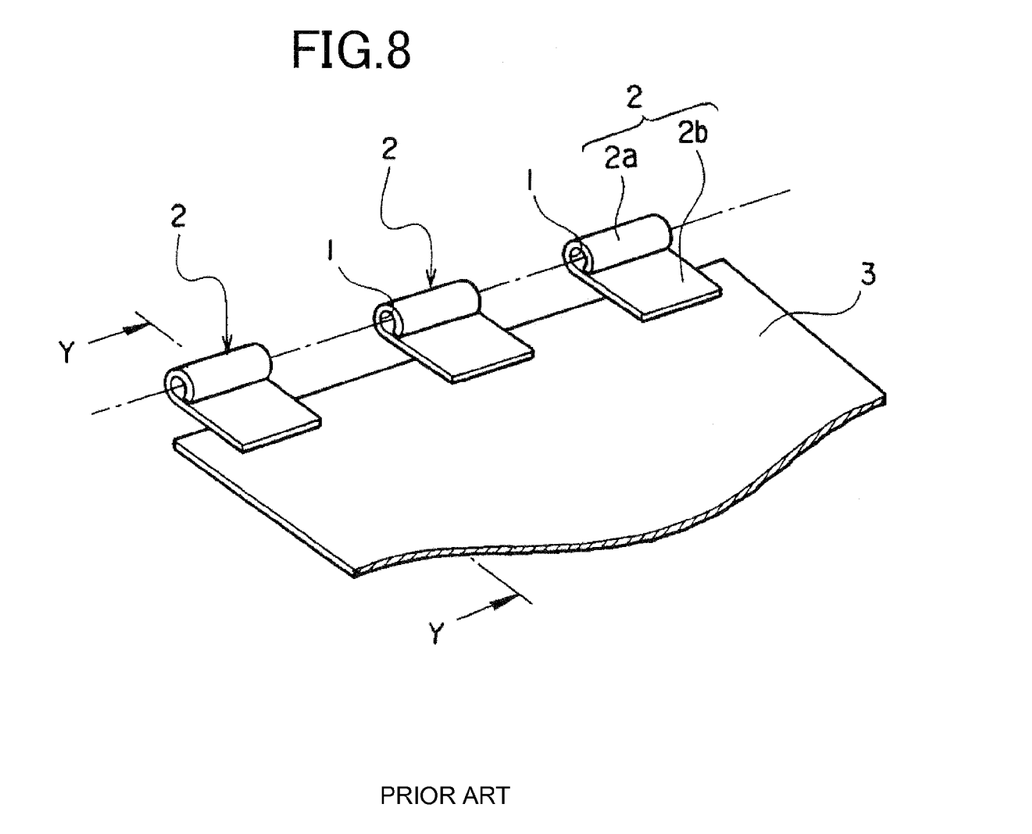
FIG. 8 is a perspective view showing hinge structure using conventional parts fabricated by pressure forming.
Figure 9:
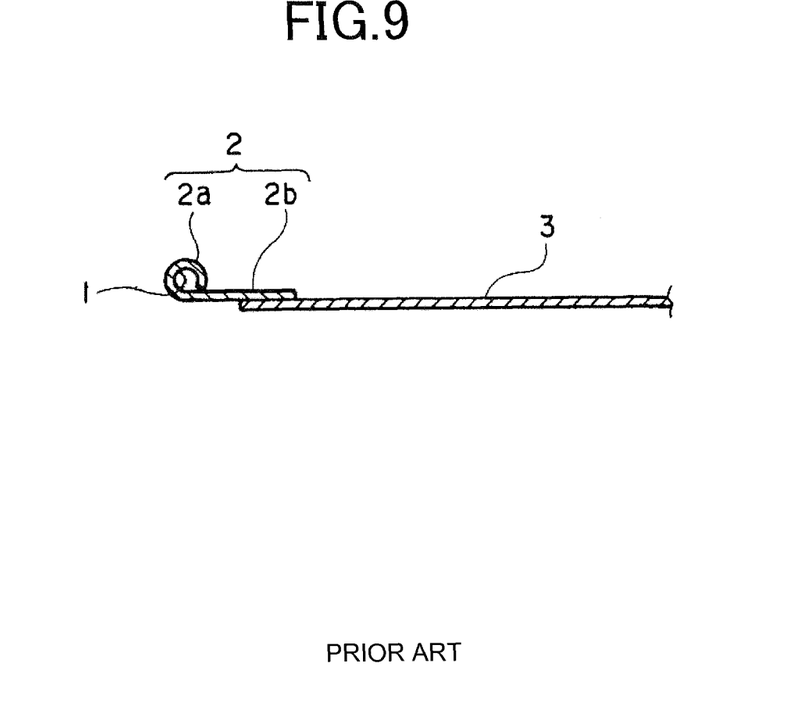
FIG. 9 is a cross sectional view taken along a line Y-Y in FIG. 8.

Conventionally, as the hinges used for the unit box of this type, for example, hinges 2 as press parts as shown in FIGS. 8 and 9 are used. Each of the hinges 2 has a tab 2a and a joint plate portion 2b. The tab 2a is folded into a tube shape to have a pin through hole 1 for engagement with a joint pin under pressure. The joint plate portion 2b is joined to an edge of the panel 3 by spot welding or using a bolt.

However, in the unit box of the fuel cell, during operation of the fuel cell, the internal pressure generated when thermal expansion of the cell stack occurs, or the high internal pressure of the fuel gas such as a hydrogen-gas flowing through the flow field is applied to the hinges. Therefore, the panels need to be securely coupled together with high mechanical strength. Further, the components need to be fabricated with high degree of accuracy to achieve the desired air-tightness for preventing leakage of gases to the outside. Though the conventional hinges can be produced at low cost as press parts, since the tabs 2a are simply fabricated by folding under pressure, the accuracy in fabrication of the tabs 2a is low. For example, the pin through hole 1 in the tab 2a may not have the perfectly circular shape. As a result, the pin through hole 1 is not engaged with the joint pin precisely. Therefore, the air-tightness is low. Further, the panels are not securely coupled together.

Figure 10:
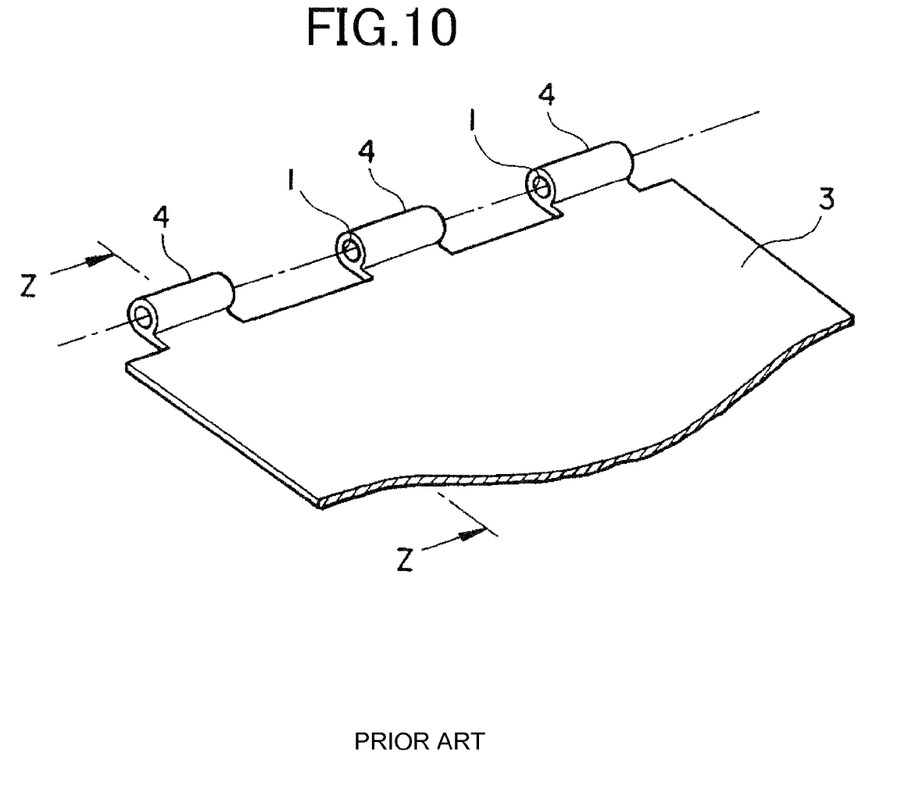
FIG. 10 is a perspective view showing hinge structure of a conventional part formed by cutting.
Figure 11:
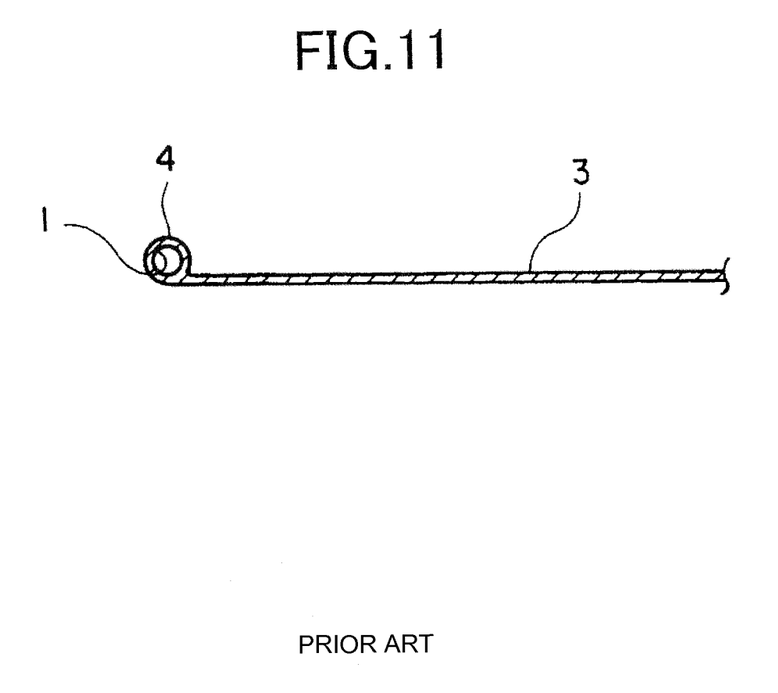
FIG. 11 is a cross sectional view taken along a line Z-Z in FIG. 10.

In an attempt to address the problem, in a conventional approach, as the hinges of the unit box, hinges 4 as shown in FIGS. 10 and 11 are adopted. The hinges 4 are formed integrally with an edge of a panel 3 by machining (cutting).

However, since the hinges 4 are formed by cutting, fabrication of the hinges 4 is laborious, and time consuming. Further, since the number of steps in fabrication is large, the hinges 4 are produced at significantly high cost.

SUMMARY OF THE INVENTION

An object of the present invention is to provide an inexpensive fuel cell unit box and a fuel cell having parts fabricated with high accuracy, and high coupling strength.

For example, as described in the following illustrated embodiments, the present invention relates to a rectangular unit box B for a fuel cell A containing a cell stack C as a stack body formed by stacking a large number of unit cells 10. The unit box B includes a stack hinge H for detachably coupling panels 15, 20 together. The stack hinge H is formed by stacking a plurality of plate hinge parts h having the same shape. The plate hinge part h includes a tab 25 having a pin through hole 25a for engagement with a joint pin 45 and a joint portion 30 joined to the panel 15. The plate hinge parts h are stacked by aligning the pin through holes 25a and fixed together into a single hinge member.

Further, for example, as described in the following illustrated embodiments, the present invention relates to a fuel cell placed in a rectangular unit box B assembled by detachably coupling a plurality of panels including side plate panels 15 and end panels 20 together using a hinge member. The hinge member comprises a stack hinge H formed by stacking a plurality of plate hinge parts h each having the same shape. The plate hinge part h includes a tab 25 having a pin through hole 25a for engagement with a joint pin 45 and a joint portion 30 joined to the panel. The plate hinge parts h are stacked by aligning the pin through holes 25a and fixed together into the hinge member.

According to the present invention, in comparison with the hinge of the conventional press part, the hinge of the present invention is fabricated with high accuracy. For example, the pin through hole has the perfectly circular shape stably. As a result, the pin through hole precisely engages with the joint pin, and the desired air-tightness in the unit box is achieved reliably. Further, it is possible to obtain the sufficient strength for firmly coupling the panels together in opposition to the internal pressure or the like applied from the inside of the unit box. Further, since the unit box is not assembled by cutting, but assembled by pressure forming and welding in a relatively simple fabrication method without any laborious or time-consuming manner, in comparison with the conventional cutting part fabricated by machining, the unit box can be produced at significantly low cost.

Further, in the present invention, the stack hinge holds the edge of the panel in the grooves of the joint portions. In the structure, the stack hinge is reliably joined to the panel with improved joining strength.

Further, in the present invention, the joint portion of the stack hinge is joined to the panel using the plate bracket. In the structure, even if the panel of the unit box is thin, it is possible to attach the hinge to the panel, and the overall weight reduction of the unit box is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Hereinafter, embodiments of the present invention will be described with reference to the drawings.

Figure 5:
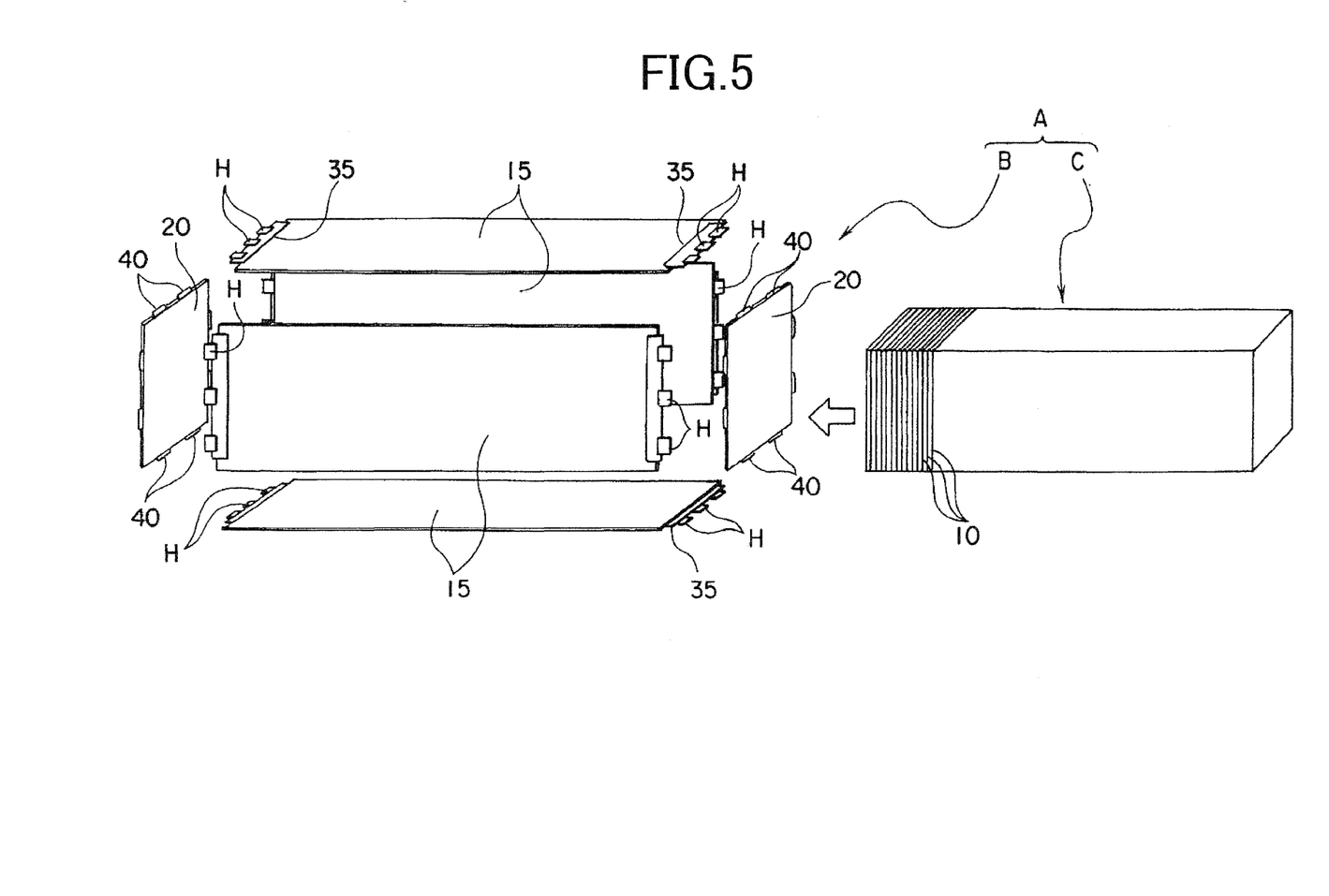
FIG. 5 is a perspective view schematically showing a fuel cell in which the unit box is disassembled.

FIG. 5 is a perspective view schematically showing a fuel cell A in which a unit box according to an embodiment of the present invention is disassembled. The fuel cell A includes a cell stack C as a stack body formed by stacking a large number of unit cells 10, and a horizontally elongated rectangular unit box B. The cell stack C can be placed in, and taken out of the unit box B. Since the unit cell 10 is known, detailed structure of the unit cell 10 is not shown in the drawings. The unit cell 10 includes an assembly and a pair of separators sandwiching the assembly. The assembly includes a cathode, an anode, and an electrolyte interposed between the cathode and the anode. Each of the separators has a fuel gas flow field for supplying a fuel gas or an oxygen-containing gas flow field for supplying an oxygen-containing gas.

The unit box B includes four side plate panels 15 and two end panels 20. The side plate panels 15 and the end panels 20 are assembled into a rectangular box shape having six surfaces. For maintenance operation such as replacement of the unit cell 10, the side plate panels 15 are detachably coupled together using bolts to form a rectangular cylinder case. The end plates 20 are coupled to opposite ends of the case using stack hinges H in a manner that all the components of the case can be disassembled/assembled easily.

Figure 1:
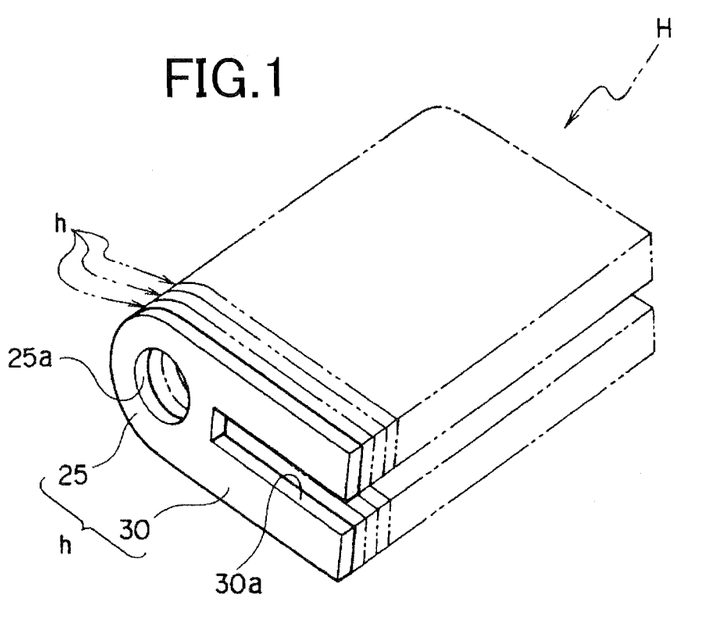
FIG. 1 is a perspective view showing a stack hinge of a unit box according to an embodiment of the present invention.
Figure 2:
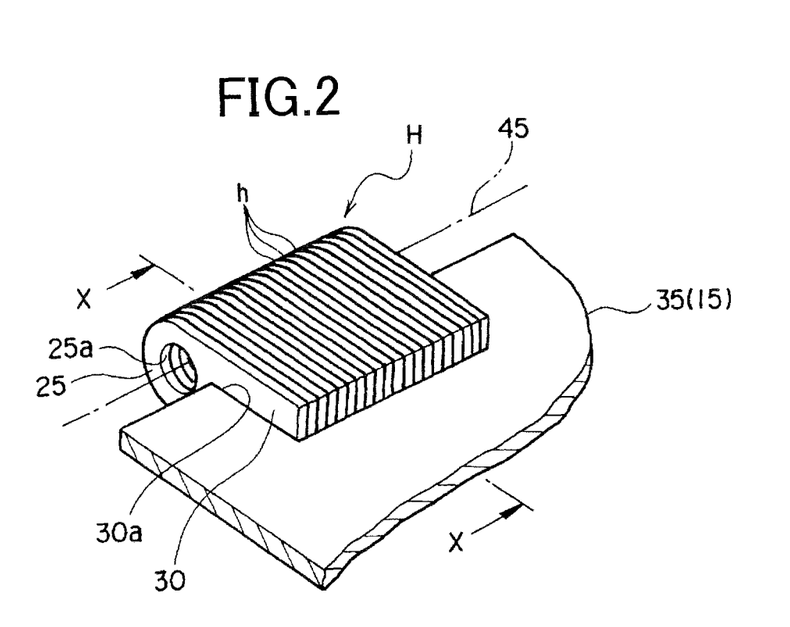
FIG. 2 is a partial perspective view showing the stack hinge joined to a side plate panel.

In the unit box B, as shown in FIGS. 1 and 2, the stack hinge H used for coupling the side plate panel 15 and the end panel 20 comprises a hinge member formed by stacking a plurality of metal plate hinge parts h each having the same shape into one piece. Each of the plate hinge parts h is fabricated by blanking a metal (blank) plate having a thickness in the range of 0.2 mm to 10.0 mm (preferably, 11.0 mm to 3.0 mm in consideration of performance in fabrication by pressure forming and welding performance) such as a stainless steel plate under pressure to include a tab 25 having a perfectly circular through hole 25a for engagement with a joint pin, and a joint portion 30 having a groove (recess) 30a for holding the side plate panel 15. Each of the plate hinge parts h is formed into one piece having the same plate shape. The width of the groove 30a corresponds to the thickness of a plate bracket 35 fixed to a side edge of the side plate panel 15 as described later. That is, the groove 30a is a cutout of the plate hinge part h in a shape of an elongated recess. In the illustrated embodiment, each plate hinge part h undergoes shearing fabrication by blanking under pressure. Alternatively, the plate hinge part h may be formed by other simple shearing fabrication methods such as wire cutting.

The plate hinge parts h each having the same shape as described above by shearing fabrication are stacked together by aligning the pin through holes 25a with the same axial line. The plate surfaces of the plate hinge parts h are welded together, e.g., by laser welding to assemble the plate hinge parts h into a single hinge member. In this manner, the stack hinge H is fabricated. Instead of using laser welding, the plate hinge parts h may be fixed by other fixing methods such as crimping.

Figure 3:
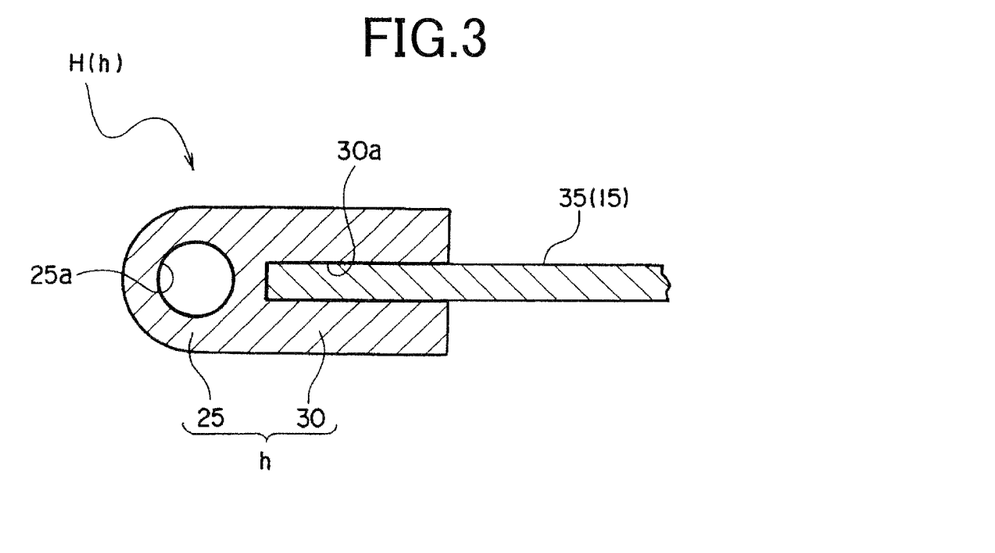
FIG. 3 is a cross sectional view taken along a line X-X in FIG. 1.
Figure 4:
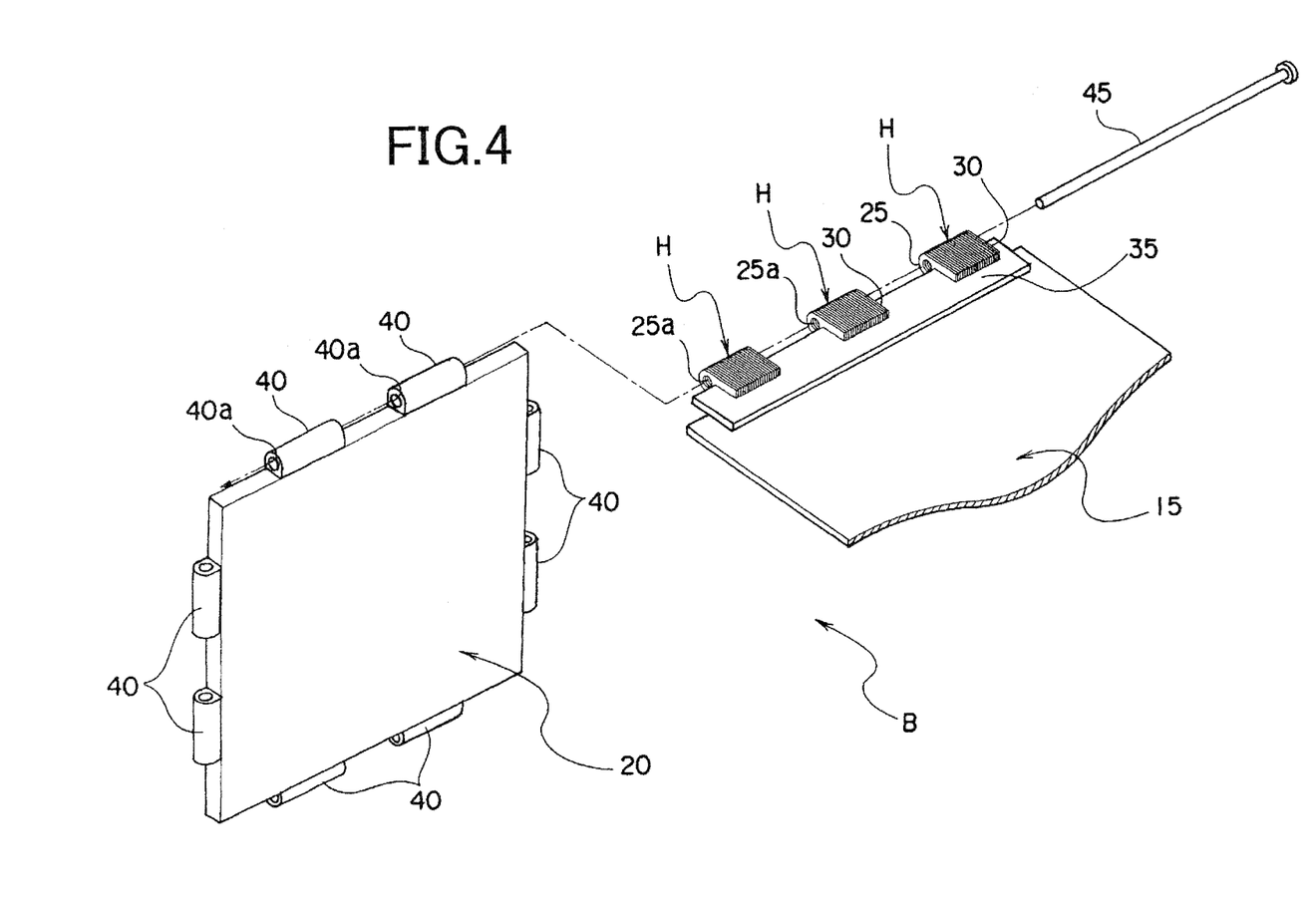
FIG. 4 is a perspective view showing a state in which an end plate is coupled to the side plate panel.

In the illustrated embodiment, the stack hinges H are attached to opposite edges of the respective side plate panels 15 through elongated metal plate brackets 35. At this time, as shown in FIGS. 2 and 3, each of the stack hinges H holds the plate bracket 35 by inserting the side edge of the plate bracket 35 into the groove 30a of the joint portion 30. The stack hinge H is fixed to the plate bracket 35 by welding or brazing. As shown in FIG. 4, the plate bracket 35 assembled with the stack hinges H is fixed to each of the opposite edges of the side plate panels 15 by welding or the like.

At the time of coupling the side plate panels 15 and the end panels 20 using the stack hinges H to assemble the unit box B, joint pins 45 are inserted into the pin through holes 25a of the tabs 25 of the stack hinges H and pin through holes 40a of tabs 40 at four sides edges of the end panels 20. At the time of disassembling the unit box B, the joint pins 45 are taken out of the pin through holes 25a, 40a. Thus, the components of the unit box B can be separated from each other easily.

Figure 6:
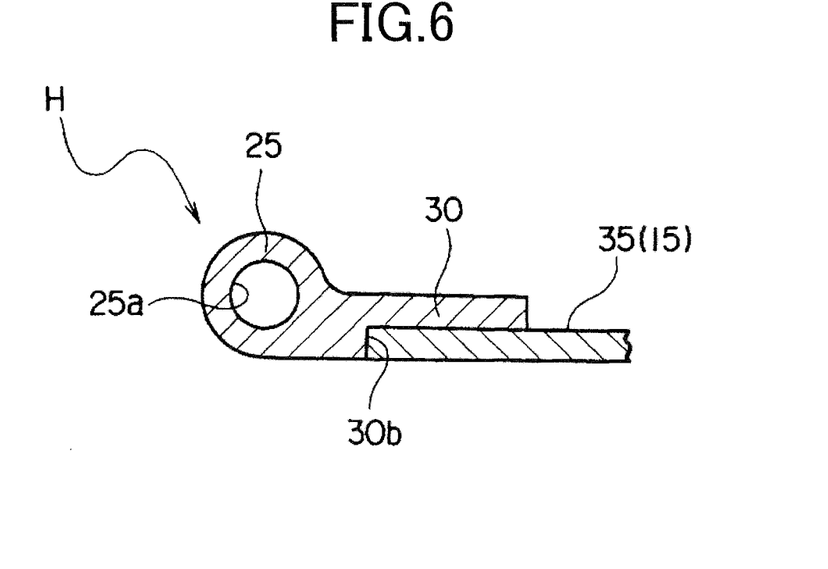
FIG. 6 is a longitudinal sectional view showing a stack hinge according to a modified embodiment.

In the illustrated embodiment, the joint portions 30 of the plate hinge parts h have the grooves 30a. The stack hinge H holds the plate bracket 35 inserted into the grooves 30a. In this state, the stack hinge H is welded to the plate bracket 35. Alternatively, for example, a stack hinge H as shown in FIG. 6 may be adopted. In FIG. 6, a step 30b is provided on one surface of the joint portion 30 such that the step 30b abuts against the plate bracket 35 for engagement. In this state, the stack hinge H and the plate bracket 35 are welded together.

Figure 7:
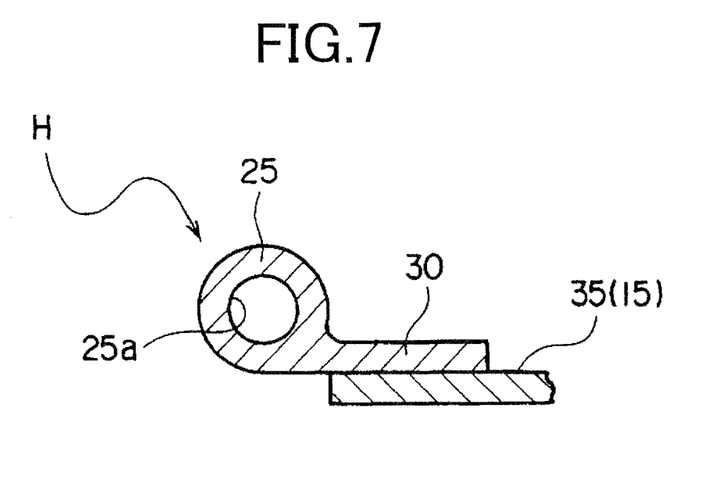
FIG. 7 is a longitudinal sectional view showing a stack hinge according to another modified embodiment.

Further, a stack hinge H as shown in FIG. 7 may be adopted. In FIG. 7, the joint portion 30 is simply formed in a flat plate shape, and one surface of the joint portion 30 contacts the side edges of the plate bracket 35. In this state, the stack hinge H and the plate bracket 35 are welded together.

In the stack hinge H according to the illustrated embodiments, the joint portion 30 is welded to the side plate panel 15 through the plate bracket 35. Alternatively, as long as the side plate panel 15 has panel structure with a predetermined strength, it is a matter of course that the joint portion 30 can directly be welded to the side plate panel 15 for fixing the stack hinge H to the side plate panel 15.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A rectangular fuel cell unit box containing a stack body as a cell stack formed by stacking a plurality of unit cells, the fuel cell unit box comprising:
   a first and second end panel equipped with end panel tabs having pin through holes, the first and second end panels located at respective ends of the stack body adjacent and parallel to the stacked unit cells;
   a plurality of side panels; and
   a stack hinge for detachably coupling one of the side panels and the first or second end panel together, said stack hinge including a plurality of stacked plate hinge parts that are stacked along a side of said one of the side panels, the stacked plate hinge parts each having the same shape that includes a tab at one end of the stacked plate hinge part and a joint portion at another end of the stacked plate hinge part, the tab having a pin through hole for engagement with a joint pin, each joint portion joined to said one of the side panels,
   wherein said stacked plate hinge parts have aligned pin through holes and are joined to one another into a single hinge member, the joint pin detachably coupling the one of the side panels and the first or second end panel together by engaging the respective pin through holes of the plate hinge parts and the pin through holes of the end panel tabs.

2. The fuel cell unit box of claim 1, wherein said joint portion of each said stacked plate hinge part has a groove for holding an edge of said one of the side panels at said joint portion.

3. The fuel cell unit box of claim 1, wherein said joint portion is joined to said one of the side panels through a plate bracket.

4. A fuel cell comprising:
a cell stack including a stack body formed by stacking a plurality of unit cells, and
a rectangular unit box containing the cell stack and including a plurality of side panels and a first and second end panel, the first and second end panels located at respective ends of the stack body adjacent and parallel to the stacked unit cells, the rectangular unit box assembled by detachably coupling one of the side panels and the first or second end panel together using a stack hinge, the stack hinge including a plurality of stacked plate hinge parts that are stacked along a side of said one of the side panels, the stacked plate hinge parts each having the same shape that includes a tab at one end of the stacked plate hinge part and a joint portion at another end of the stacked plate hinge part, the tab having a pin through hole for engagement with a joint pin, each joint portion joined to said one of the side panels, wherein said stacked plate hinge parts have aligned pin through holes and are joined to one another into said hinge member.

5. The fuel cell of claim 4, wherein said joint portion of each said stacked plate hinge part has a groove for holding an edge of said one of the side panels at said joint portion.

6. The fuel cell of claim 4, wherein said joint portion is joined to said one of the side panels through a plate bracket.

\* \* \* \* \*